May 27, 1969 P. H. SHERRON 3,445,969

TELEPHONE BOOTH

Filed Sept. 12, 1966 Sheet 1 of 4

INVENTOR.
PERCIVAL H. SHERRON
BY
Busser, Smith & Harding
ATTORNEYS.

INVENTOR.
PERCIVAL H. SHERRON
BY
Busser, Smith & Harding
ATTORNEYS.

INVENTOR.
PERCIVAL H. SHERRON
BY
Busser, Smith & Harding
ATTORNEYS.

United States Patent Office
3,445,969
Patented May 27, 1969

3,445,969
TELEPHONE BOOTH

Percival H. Sherron, Jamaica, N.Y. (% Sherron Metallic Corporation, 1201 Flushing Ave., Brooklyn, N.Y. 11237)

Filed Sept. 12, 1966, Ser. No. 578,711
Int. Cl. E04h *14/00*, E04f *19/02*
U.S. Cl. 52—28 2 Claims

ABSTRACT OF THE DISCLOSURE

A wall mounted telephone booth of the open stall type having a diagonal panel extending from the front end of one side wall to a medial portion of the rear wall and a telephone unit mounted behind the diagonal panel to be protected against vandalism, various walls of the booth being provided with acoustic insulation.

This invention relates generally to telephone booths, and more particularly to improvement in wall mounted telephone booths.

Wall mounted telephone booths of the type in accordance with this invention are of the open stall type and of a height just large enough to contain the usual telephone unit. In the installed condition of the booth, it will be spaced a considerable distance from the floor. Since the booth has substantial openings, it is essential to provide for good acoustics within the booth. It is also desirable that the booth be constructed to be resistant to damage by vandals. It is also important to construct the booth so that it can be mounted to the wall securely and readily.

It is the general object of this invention to provide an acoustic wall mounted telephone booth provided with the above-discussed desirable features by means of a novel arrangement and a combination of parts whereby a new and highly useful structure is provided.

The above and other objects and features of the invention will become apparent from a consideraion of the following description in conjunction with the accompanying drawings, in which.

Figure 1:
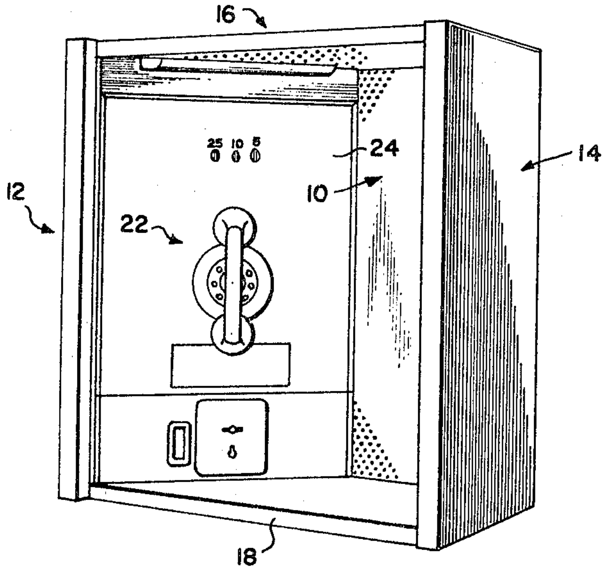
FIGURE 1 is a perspective view of a wall mounted telephone booth in accordance with the invention.
Figure 2:
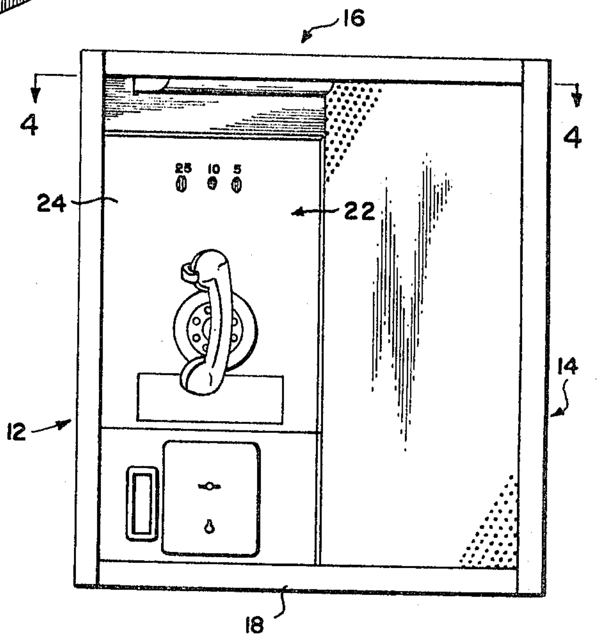
FIGURE 2 is a front elevation of the booth shown in FIGURE 1.
Figure 3:
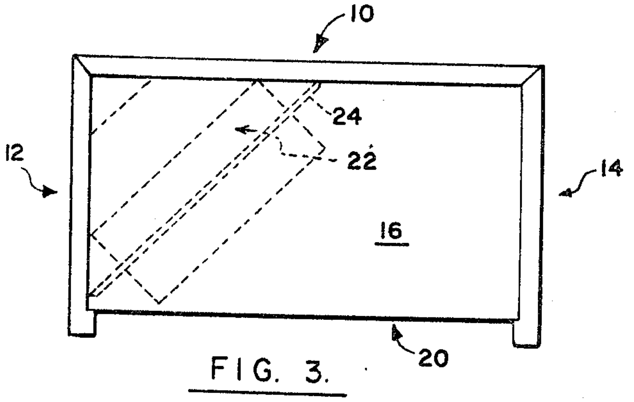
FIGURE 3 is a top view of the booth.

Referring particularly to FIGURES 1 to 3, the wall mounted telephone booth in accordance with the invention is rectangular in form and comprises a rear wall 10, a left side wall 12, a right side wall 14, a top wall 16 and a bottom shelf 18. The front of the booth is open so that there is provided a rectangular access opening 20. A telephone unit indicated generally at 22 is mounted on the left side of the booth and is of a vandal resistant type in which only the essential parts of the telephone are exposed, namely, the receiver, the dial, the coin receiving openings and the return slot. The remainder of the telephone unit is enclosed behind a panel 24 which extends across the left corner of the booth from the front end of the left side wall 12 to approximately the middle of the rear wall 10.

Figure 4:
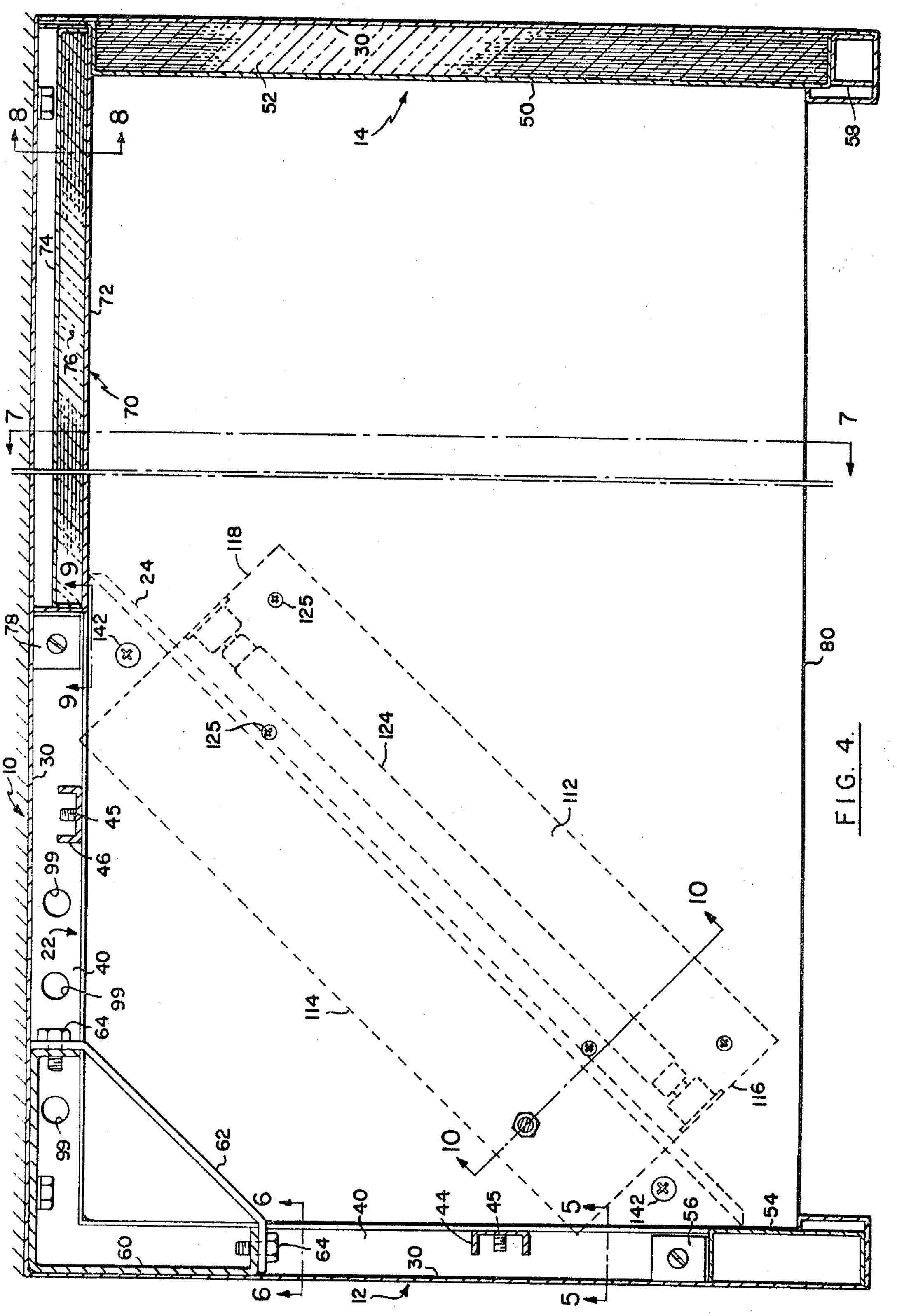
FIGURE 4 is a transverse section through the booth taken generally on the line 4—4 of FIGURE 2.

Referring now particularly to FIGURE 4, there is provided a shell member 30 of sheet metal bent into the condition shown in the drawing so as to form the outside shell of the rear wall 10 and the side walls 12 and 14. The member 30 extends vertically between the top wall 16 and the bottom shelf 18. The ends of member 30 located at the front of the booth are bent in the form shown in FIGURE 4 to form the front ends of the walls 12 and 14.

Figure 5:
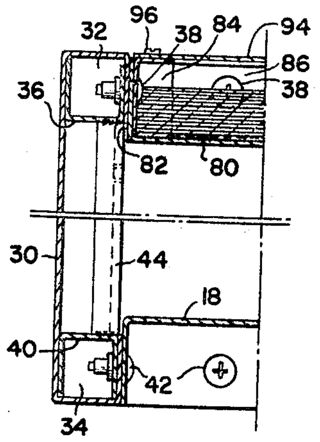
FIGURE 5 is a fragmentary sectional view taken on line 5—5 of FIGURE 4.
Figure 6:
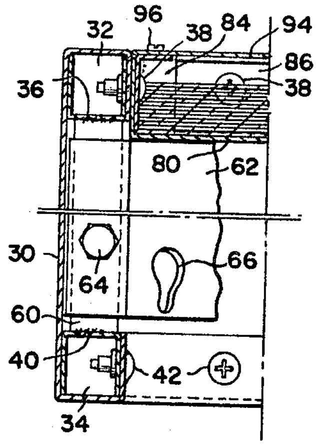
FIGURE 6 is a fragmentary sectional view taken on line 6—6 of FIGURE 4.
Figure 7:
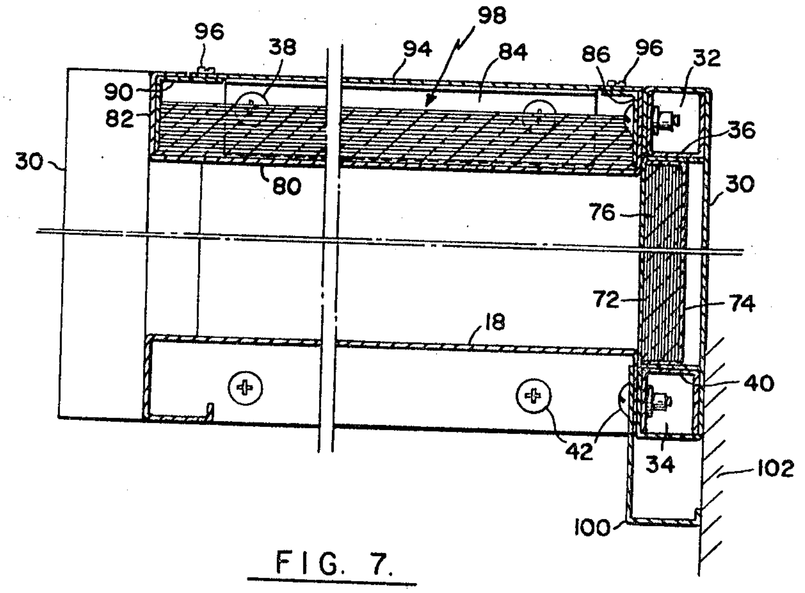
FIGURE 7 is a fragmentary sectional view taken on line 7—7 of FIGURE 4.

As is best shown in FIGURES 5, 6 and 7, the shell member 30 is bent inwardly and downwardly along its upper end and inwardly and upwardly along its lower end to provide upper and lower channel receiving troughs 32 and 34, respectively. The channel receiving troughs 32 and 34 are provided with a rear leg and left and right side legs at the upper and lower ends, respectively, of the rear wall 10, the left wall 12 and the right wall 14 of the booth. Mounted within each of the legs of the upper channel receiving trough 32 are U-shaped channel members 36 secured in position by suitable mounting screws 38 in engagement with rivnuts, the channel members 36 being nested in the position shown in the drawings with their bases facing downwardly. Mounted within each of the lower channel receiving trough 34 are U-shaped channel members 40 secured in position, with their bases facing upwardly, by suitable mounting screws 42 in engagement with rivnuts. A pair of upright channels 44 and 46 extend between the upper and lower channel members 36 and 40 located within the left and rear walls, respectively. The upright channels 44 and 46 are secured, as by welding, at their upper and lower ends to the abutting channel members 36 and 40 as is best illustrated in FIGURE 5. An upright perforated panel member 50 bent into the shape illustrated in FIGURE 4 extends between the upper and lower channel members of the right wall 14, said panel 50 being spaced from the shell member 30 to define therewith a vertically extending space 52. A suitable acoustic insulation, such as Fiberglas, is positioned with the vertical space 52.

An upright U-shaped channel member 54 is mounted at the front end of the left wall 12 and is held in position by an angular stop member 56 as is best shown in FIGURE 4. The base portion of the channel member 54 faces toward the interior of the booth. An upright U-shaped channel member 58 is mounted at the front end of the right wall 14 with its base facing toward the front end of the upright panel 50 as is shown in FIGURE 4.

The backboard for supporting a telephone unit 22 is mounted in the left rear corner of the booth and comprises a backboard angle 60 nested within the left corner and extending vertically between the upper and lower channel members 36 and 40, and an angular face plate 62 secured to the backboard angle by means of mounting screws 64 cooperating with overlapping portions of the face plate 62 and backboard angle 60 as is best shown in FIGURE 4. The backboard angle 60 is welded to the channel members 36 and 40. As is shown in FIGURE 6, the face plate 62 terminates a short distance from the upper and lower channel members 36 and 40 and is provided with a central portion extending diagonally across the corner of the booth. The central portion of the face plate 62 is provided with keyhole slot openings 66 adapted to be engaged by suitable mounting studs on the telephone unit in accordance with well-known mounting arrangements. Accordingly, the telephone unit is supported on the backboard structure by engagement between the telephone unit studs and the face plate 62. The telephone unit 22 is of the type having a generally triangular shape so that it fits in the corner space provided and is mounted by means of screws which pass through the back wall thereof into tapped holes in the face plate 62 and is secured to channels 44 and 46 by screws 45.

Figure 9:
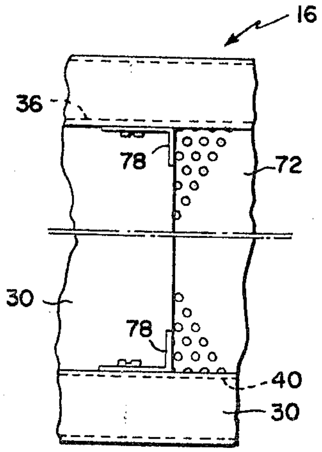
FIGURE 9 is a fragmentary sectional view taken on line 9—9 of FIGURE 4.

An upright rear panel 70, extending between the upper and lower channel members 36 and 40 of the rear wall 10 of the booth, is mounted adjacent the shell member 30 as is shown in FIGURE 4. The panel 70 extends from the right rear corner of the booth to approximately the middle of the rear wall 10 and comprises a perforated panel member 72 facing the interior of the booth and a second panel member 74 nested within the vertically extending lateral edges of the perforated panel member 72 to define an enclosed chamber 76. A suitable acoustic insulation, such as Fiberglas, is positioned within the chamber 76. One vertically extending end of the panel 70 is positioned adjacent the right rear corner of the booth and is nested between the rear vertical end of the right side panel member 50 and the opposed portion of the shell member 30. The other vertically extending end of the panel cooperates with a pair of angle stops 78 (as is best shown in FIGURE 9) which serve to removably secure the rear panel 70 in the installed position.

The top wall 16 of the booth comprises a horizontally extending perforated ceiling 80 provided with vertical flange portions 82 extending along the vertical turned down portions of the shell member 30, four angle members 84, 86, 88 and 90 positioned inwardly of the ceiling flange portions 82, and a roof 94 supported on the horizontally extending legs of the angle members 84–90 and secured thereto by screws 96. The mounting screws 38 secure the flange portions 82 and the vertical legs of the angle members 84–90 to vertical portions of channel members 36. A suitable acoustic insulation, such as Fiberglas, is positioned within the ceiling chamber 98 between the roof 94 and the ceiling 80 and rests on the upper wall of the ceiling 80 as is best shown in FIGURE 7.

The shelf 18 consists of a sheet bent into the configuration best shown in FIGURES 5 to 8 and comprises a horizontal portion and downwardly extending flange portions. Mounting screws 42 secure the flange portions to the lower portions of the rear and side walls. Along its forward edge, the shelf is bent downwardly and rearwardly as is shown in FIGURE 7.

Figure 8:
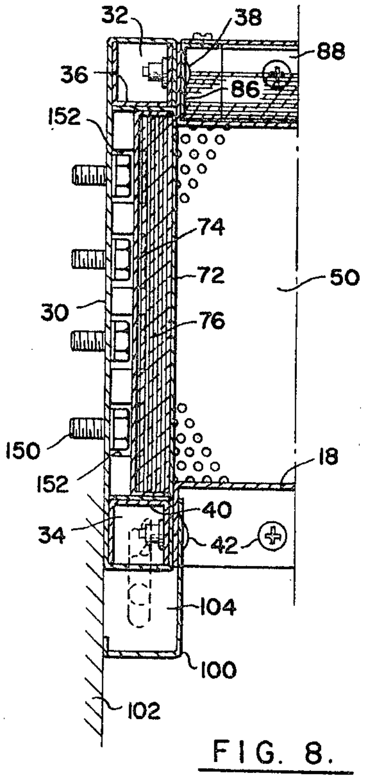
FIGURE 8 is a fragmentary sectional view taken on line 8—8 of FIGURE 4.

A trough 100 for containing the telephone and electric service wires, illustrated in FIGURE 8, is mounted along the bottom rear edge of the booth by the mounting screws 42. The wires pass through suitable openings 99 in the rear channel 40. The trough 100 comprises a downwardly and rearwardly extending channel forming member which cooperates with the booth supporting wall 102 to define a horizontally extending chamber 104.

Figure 10:
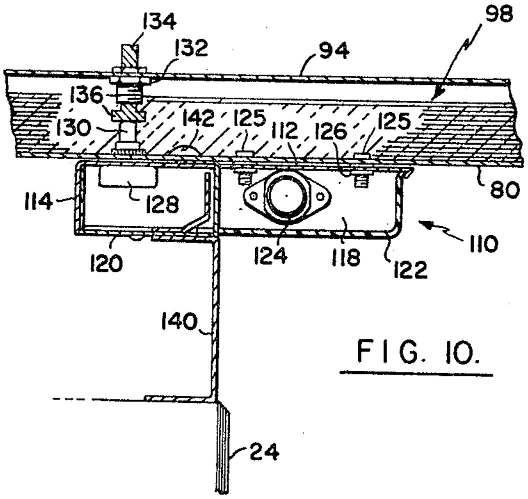
FIGURE 10 is a fragmentary sectional view taken on line 10—10 of FIGURE 4.

The booth is provided with a lighting means in the form of a fluorescent light fixture 110 generally rectangular in form and comprising a rectangular top wall 112, a rear wall 114, end walls 116 and 118, a bottom wall 120, and a plastic diffuser 122 adapted to snap into and out of the assembled position shown in FIGURE 10. Mounted within the enclosed space of the fixture 110 above the diffuser 122 is a fluorescent lamp 124 mounted on the end walls 116 and 118 in accordance with well known construction. The light fixture 110 is mounted on the ceiling 80 by means of four screws 125 which extended from the ceiling chamber through the ceiling 80 into engagement with rivnuts 126 mounted on the top wall 112 of the lighting fixture 110. By this arrangement the mounting screws 125 are concealed by the roof 94 which encloses the ceiling chamber. The lighting fixture 110 is mounted in the position shown in FIGURE 4 so that the lamp 124 is positioned to illuminate the dial of the telephone. The lamp 124 is provided with the usual starter switch 128 of the push type. The button 130 of the starter switch 128 projects upwardly through the top wall of the lighting fixture 110 and through the ceiling 80 into the ceiling chamber.

Means are provided to permit actuation of the switching means for the lamp from a location above the roof 94 of the booth. Such means comprises a bearing 132 mounted on the roof 94 and a pin 134 mounted for vertical movement within the bearing 132. The lower end of the pin has an enlarged head 136 aligned with the upper end of the button 130 for the lighting switch 128. By this arrangement, the switching means for the lamp is readily available from above the roof for servicing requirements but is out of view of the telephone user so as to avoid tampering therewith by vandals or the like. A head trim panel 140 is mounted on the ceiling 80 by a pair of mounting screws 142. The panel 140 extends across the booth along the top of the panel 24.

The booth is mounted to the wall 102 by means of eight mounting screws 150. Four of the mounting screws 150 are vertically spaced along each rear corner of the booth. The heads of the screws 150 are on the interior of the shell member 30. The mounting screws 150 in the left rear corner of the booth extend from within through holes in the shell member 30 and the angle member 60 into engagement with the wall 102. The four mounting screws 150 in the right rear corner of the booth extend through holes shell member 30 into engagement with the wall 102. It will be apparent that in order to gain access for assembly or disassembly of the screws 150 in the left rear corner, the backboard face plate 62 can be removed from its assembled position However, it is not necessary that the face plate 62 be removed since suitable holes (not shown) are provided in the face plate whereby the mounting screws may be inserted into the wall through these holes without removing the face plate. In order to gain access for assembly and disassembly of the screws 150 in the right rear corner of the booth, the angle stops 78 are removed and the rear panel 70 is slid to the left. After the insertion of the mounting screws 150, the rear panel 70 is moved back behind the side panel 50 to the position shown in FIGURE 4 to thereby conceal the mounting screws 150 and the stops 78 secured in position. The side flange of the panel member 72 is provided with suitable slots 152 to clear the heads of the mounting screws 150. It will thus be apparent that the heads of the mounting screws 150 are concealed from view and enclosed against access in the wall mounted condition of the booth.

One of the features of the invention is the efficient use of the acoustic insulation. It will be apparent that the acoustic insulation is located only in the top wall 16, the right side wall 14, and the right hand of the rear wall in the panel 70. There is no insulation in the left wall 12 or the portion of the rear wall behind the face plate 24 of the telephone unit, it being noted that the telephone unit itself provides some acoustic insulation. Accordingly, there is achieved an effective acoustic insulation of the booth with a minimum of material.

Another feature of the invention is that the booth is designed so that it can be constructed for the left or right hand mounting of the telephone. It is possible to achieve left or right hand mounting of the telephone with essentially the parts described and with a minimum of rearrangement of the parts shown and described herein.

Other features of the invention have been discussed previously or are apparent from the construction.

It will be understood that various modifications and changes may be made in the construction and arrangement of parts without departing from the scope of the invention. Accordingly, it is not desired to be limited except as required by the following claims.

What is claimed is:

1. A telephone booth adapted to be mounted on an upright wall comprising an upright rear wall, a pair of upright side walls extending forwardly from ends of said rear wall, each of said side walls extending approximately the same distance from and being perpendicular to the rear wall throughout their extent, a shell means defining the outer faces of said rear wall and said side walls, a first front corner post means at the forward end of one of said side walls, a second front corner post means at the forward end of the other of said side walls, a rear panel defining an internal face of said rear wall and extending from an end of said rear wall to a medial location of said rear wall, means providing the vertically extending end of said rear panel at said medial location, a horizontally extending top wall extending across the top of said rear and side walls, the forward ends of said wall defining an access opening in the front of the booth, a telephone unit mounted in a rear corner of the booth adjacent said one side wall including a panel extending diagonally across the booth from a location adjacent said first front corner post to said medial location of said vertically extending end of said rear panel to provide the front face of said telephone unit, the major portion of the telephone unit being enclosed behind said panel, mounting screws extending from within said rear wall outwardly for engagement with the wall on which the telephone booth is to be mounted, means for concealing and blocking access to the heads of said mounting screws from the interior of the booth, acoustic insulation being provided only in the wall areas of said top wall, said other side wall, and the area of said rear wall between said vertically extending end of said rear panel and the end of said rear wall adjacent said other side wall, there being provided no acoustic insulation in said one side wall and in the portion of said rear wall behind said diagonal panel, and lighting means mounted on said top wall and arranged to illuminate said telephone unit panel.

2. A telephone booth according to claim 1 wherein said top wall comprises a horizontal ceiling and a horizontal roof spaced above the ceiling, and wherein said lighting means includes a switching means operable between a pair of control positions for controlling the lighting means and means for actuating said switching means between said positions thereof including means extending from said switching means through said top wall to a location above said roof, said last-mentioned means being operable from above the roof for controlling the switching position of said switching means.

References Cited

UNITED STATES PATENTS

| | | | |
|---|---|---|---|
| 2,302,106 | 11/1942 | Corso | 52—36 |
| 2,912,073 | 11/1959 | Sherron | 52—28 |
| 2,982,593 | 5/1961 | Chambers | 52—27 X |
| 3,164,868 | 1/1965 | Hannula et al. | 52—239 X |
| 3,225,498 | 12/1965 | Sherron | 52—27 |
| 3,247,332 | 4/1966 | McHugh | 52—27 X |
| 3,300,917 | 1/1967 | Bartley et al. | 52—238 X |
| 2,371,968 | 3/1945 | Lum | 52—28 X |

HENRY C, SUTHERLAND, *Primary Examiner.*

JAMES L. RIDGILL, JR., *Assistant Examiner.*

U.S. Cl. X.R.

52—239, 262